United States Patent [19]
Soma

[11] Patent Number: 5,404,771
[45] Date of Patent: Apr. 11, 1995

[54] DEVICE FOR DISPOSING THE TOE CLIPS ON BICYCLE PEDALS IN UPRIGHT OPERATIVE POSITIONS WHEN THE TOE CLIPS ARE NOT ENGAGED BY THE CYCLISTS SHOES

[76] Inventor: David N. Soma, 1060 A Custer Dr., Washburn, N. Dak. 58577

[21] Appl. No.: 66,433

[22] Filed: May 25, 1993

[51] Int. Cl.6 .............................................. G05G 1/14
[52] U.S. Cl. ..................................... 74/594.6; 482/63; 482/57; 280/241; 280/252; 601/36
[58] Field of Search ................. 74/594.4, 594.6, 594.7; 482/63, 57, 64, 60, 61; 280/241, 252; 601/36

[56] References Cited

U.S. PATENT DOCUMENTS

| | | | |
|---|---|---|---|
| 3,982,756 | 9/1976 | Hersey et al. | 482/60 |
| 4,537,396 | 8/1985 | Hooper | 482/59 X |
| 4,717,146 | 1/1988 | Nohara | 601/36 |
| 4,846,156 | 7/1989 | Kopnicky | 482/62 X |
| 4,909,526 | 3/1990 | Vazin | 74/594.4 X |
| 4,993,407 | 2/1991 | Chen | 482/57 X |
| 5,236,211 | 8/1933 | Meguerditchian | 280/241 |
| 5,254,060 | 10/1993 | Bohanan | 482/62 X |

FOREIGN PATENT DOCUMENTS

| | | | |
|---|---|---|---|
| 1070769 | 8/1954 | France | 601/36 |
| 70258 | 12/1969 | German Dem. Rep. | 482/57 |
| 851234 | 10/1960 | United Kingdom | 601/36 |
| 1600816 | 10/1990 | U.S.S.R. | 482/57 |
| 84/00459 | 4/1985 | WIPO | 482/57 |

*Primary Examiner*—Vinh T. Luong
*Attorney, Agent, or Firm*—David A. Lingbeck

[57] ABSTRACT

A device for disposing toe clips on bicycle pedals in upright positions when the toe clips are not engaged by the cyclist's shoes comprises a pivot member suspended from the crossbar of the frame of the bicycle centrally above the sprocket wheel connected to the bicycle pedals, a pulley mechanism swivelly connected to the pivot member, and an elastic line which is carried by the pulley mechanism and which has ends detachably connected to the tops of the toe clips at the open ends of the toe clips. The pulley mechanism pivots about the pivot member in response to the movements of the toe clips to substantially prevent the elastic line from becoming entangled with the bicycle or with the user and also anchors the elastic line which urges the toe clips in upright operative positions so that the user can quickly and conveniently put his/her shoes in the toe clips.

3 Claims, 4 Drawing Sheets

DEVICE FOR DISPOSING THE TOE CLIPS ON BICYCLE PEDALS IN UPRIGHT OPERATIVE POSITIONS WHEN THE TOE CLIPS ARE NOT ENGAGED BY THE CYCLISTS SHOES

BACKGROUND OF THE INVENTION

This invention relates to a device for disposing toe clips on bicycle pedals in upright operative positions when the toe clips are not engaged by the cyclist's shoes so that the rider can easily and conveniently insert his/her feet in the toe clips when mounting the bicycle without having to search for and position the toe clips for receiving his/her feet.

Cyclists, especially those who race, bicycle long distances, or bicycle through the mountains often use toe clips on the forward ends of the pedals to prevent their feet from becoming disengaged from the pedals, and have to align the pedals when they mount the bicycles so that they can insert their feet in the pedals. Different types of devices have been proposed in the prior art to orient the bicycle pedals for the riders to easily place their feet upon the pedals. However, upon review of the prior art, none suggest or describe the present invention.

One known prior art is an INTEGRATING BICYCLE PEDAL WITH SELF CENTERING AND LATERAL RELEASE CAPABILITIES, U.S. Pat. No. 4,815,333, which comprises a cleat attached to the cyclist's shoe under the ball area of the foot with the pedal body being shaped to matingly engage the cleat on the bottom of the cyclist's shoe to prevent the cyclist's shoe from becoming disengaged from the pedal while the user rides the bicycle.

Another known prior art is a METHOD AND STRUCTURE FOR ORIENTING A BICYCLE PEDAL, U.S. Pat. No. 4,103,563, which comprises magnetic means to automatically orient the bicycle pedal when the rotary crank has turned through 90 degrees beyond its top dead center position in an attitude which the pedal is directed upwardly.

Further, another known prior art is a DEVICE ALLOWING BICYCLE PEDALS TO TAKE UP A STEADY POSITION WHEN THEY ARE NOT ENGAGED BY THE CYCLIST'S SHOE, U.S. Pat. No. 4,794,817, which comprises a knurled ring formed on the pedal spindle and a lever pivotally mounted on a pin parallel the pedal spindle and positioned under the pedal body.

Yet, another known prior art is a DEVICE FOR PREVENTING THE ROTATION OF A BICYCLE PEDAL RELATIVE TO ITS PIN, U.S. Pat. No. 4,922,786, which comprises a locking element carried by the pedal and moveable, as a result of the engagement of the cyclist's shoe on the pedal, from a position of engagement with the pin, towards which the locking element is biased by a resilient spring.

The prior art is primarily focused on orienting the bicycle pedals rather than focusing on positioning the toe clips which will orient the bicycle pedals since one is attached to the other. As a result, there is a definite need for a device for positioning the toe clips on the bicycle pedals upright when the toe clips are not engaged by the shoe which is not described nor suggested by the prior and which can be installed quickly without much installation.

SUMMARY OF THE INVENTION

This invention relates to a device for disposing toe clips on the bicycle pedals in upright operative positions when the toe clips are not engaged by the cyclist's shoes, which comprises an elastic line having fasteners at the ends thereof, which are removeably attached to the top of the toe clips which are mounted upon the frontal spindle of the bicycle pedals and pivotable therewith; a pulley mechanism having a wheel rotatably mounted about a shaft which is securely attached to a pulley block member; and a pivot member suspended from the crossbar of the frame with a fastener member and securely attached to the pulley mechanism which depends therefrom and which carries the elastic line. This device disposes the toe clips in upright operative positions when they are not engaged by the user's footwear or feet regardless of the stationary positions of the toe clips in their respective orbital paths.

It is an object of the present invention to provide a device for disposing toe clips on bicycle pedals in upright operative positions when the toe clips are not engaged by the user's shoes, which allows the user to safely put his/her feet in the toe clips, thus minimizing the risk of injury to the user caused by slipping on bicycle pedals which are turned in non-operative positions.

Another object of the present invention is to provide a device for disposing toe clips on bicycle pedals in upright operative positions when the toe clips are not engaged by the user's shoes, which allows the user to quickly, easily, and conveniently put his/her feet or footwear in the toe clips as is the case for those users who are bicycle racers and the like.

Further, another object of the present invention is to provide a device for disposing toe clips on bicycle pedals in upright operative positions when the toe clips are not engaged by the user's shoes, which allows the user the luxury of easily installing and removing the device from the bicycle without altering the bicycle itself.

Also, another object of the present invention is to provide a device for disposing toe clips on bicycle pedals in upright operative positions when the toe clips are not engaged by the user's shoes, which is cost effective and which will be consistently more effective in disposing the toe clips in upright operative positions than any of the prior art.

Yet, another object of the present invention is to provide a device for disposing toe clips on bicycle pedals in upright operative positions when the toe clips are not engaged by the user's shoes, which will position the toe clips in upright operative positions regardless of where the toe clips stop in their respective orbital paths.

Further objects and advantages of the present invention will become more apparent as the description proceeds and when taken into conjunction with the accompanying drawing wherein:

DETAILED DESCRIPTION OF THE INVENTION

Figure 1:
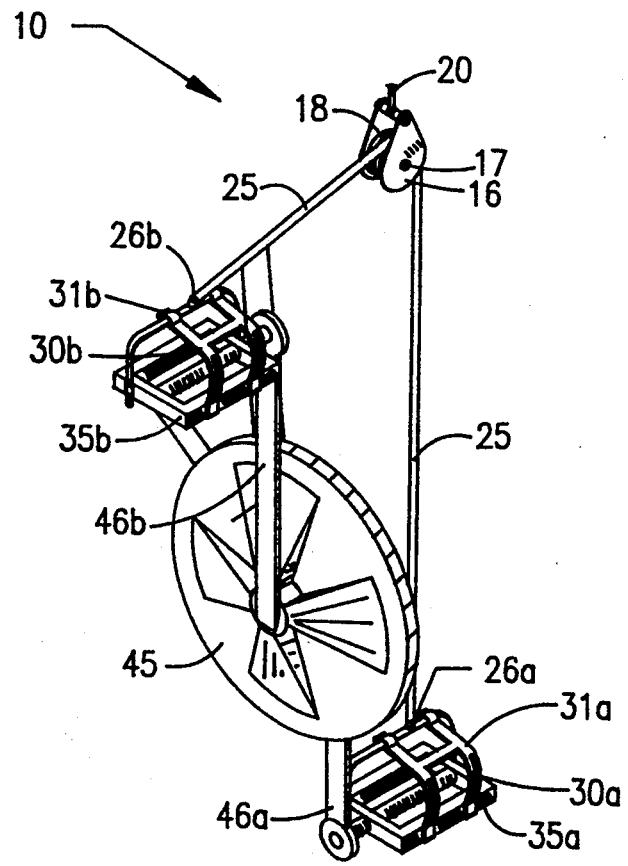
FIG. 1 is a perspective view of the device for disposing toe clips on bicycle pedals in upright operative positions.

Referring to FIGS. 1 through 4 of the drawings, in particular, the device 10 for disposing the toe clips 30a & 30b on bicycle pedals 35a & 35b in upright operative positions when the toe clips are not engaged by the user's shoes comprises a pulley mechanism 15 having a block member or body 16 which has side walls, a shaft 17 fixedly attached to the side walls of the block member or body 16, a wheel 18 having a groove about the circumference thereof and rotatably mounted upon the shaft 17, an eyelet 19 disposed in the top of the block member or body 16; an elastic line 25 carried by the pulley mechanism 15 in response to the motion of the bicycle pedals 35a & 35b and having fastener means 26a & 26b at the ends thereof, which are removeably attached to the tops 31a & 31b of the toe clips 30a & 30b at the open ends thereof; and a pivot member 20 removeably suspended from the crossbar of the frame of the bicycle 40 with a fastener member 21 and centrally positioned above the centrally-disposed sprocket wheel 45 which is fixedly attached to the arms 46a & 46b of the bicycle pedals 35a & 35b.

Figure 2:
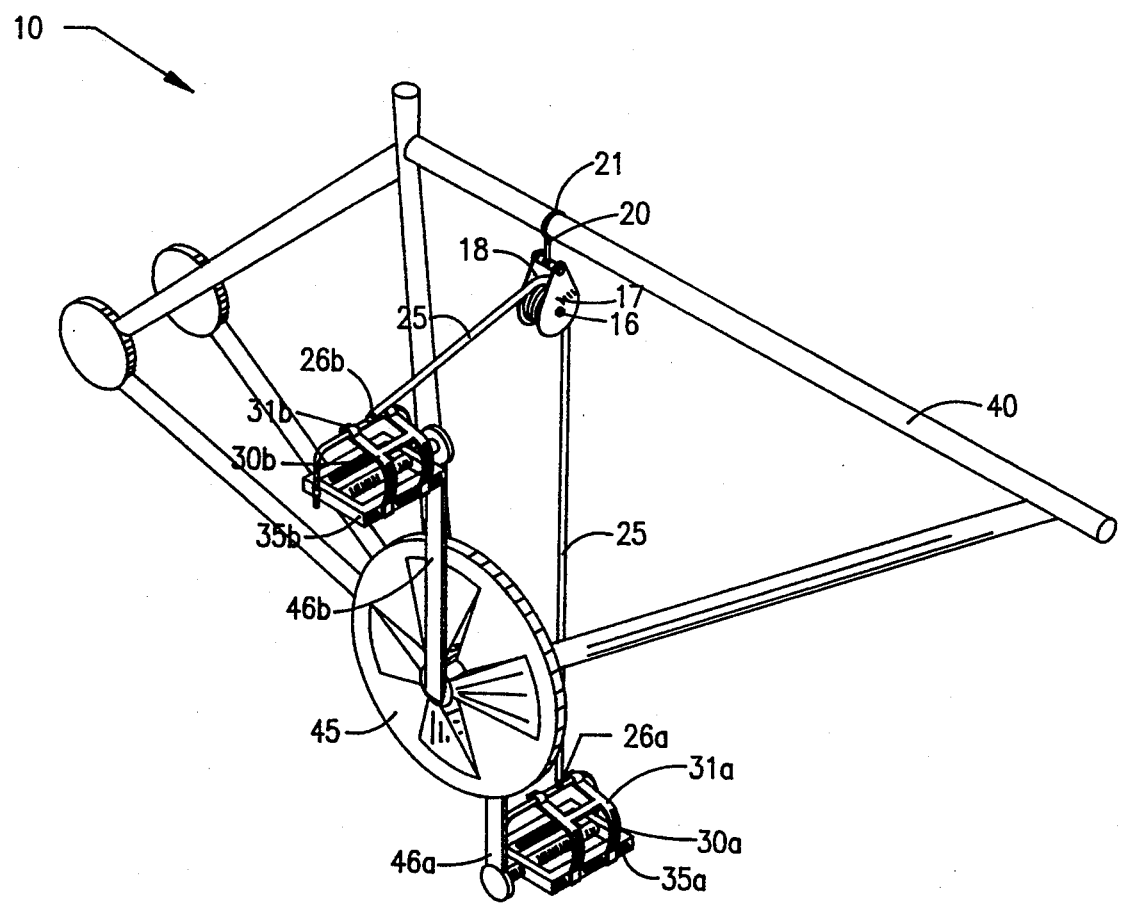
FIG. 2 is a perspective view of the device for disposing toe clips on bicycle pedals in upright operative positions depending from the crossbar of and connected to the bicycle pedals of a partially-viewed bicycle with the toe clips being generally vertically positioned relative to one another.
Figure 3:
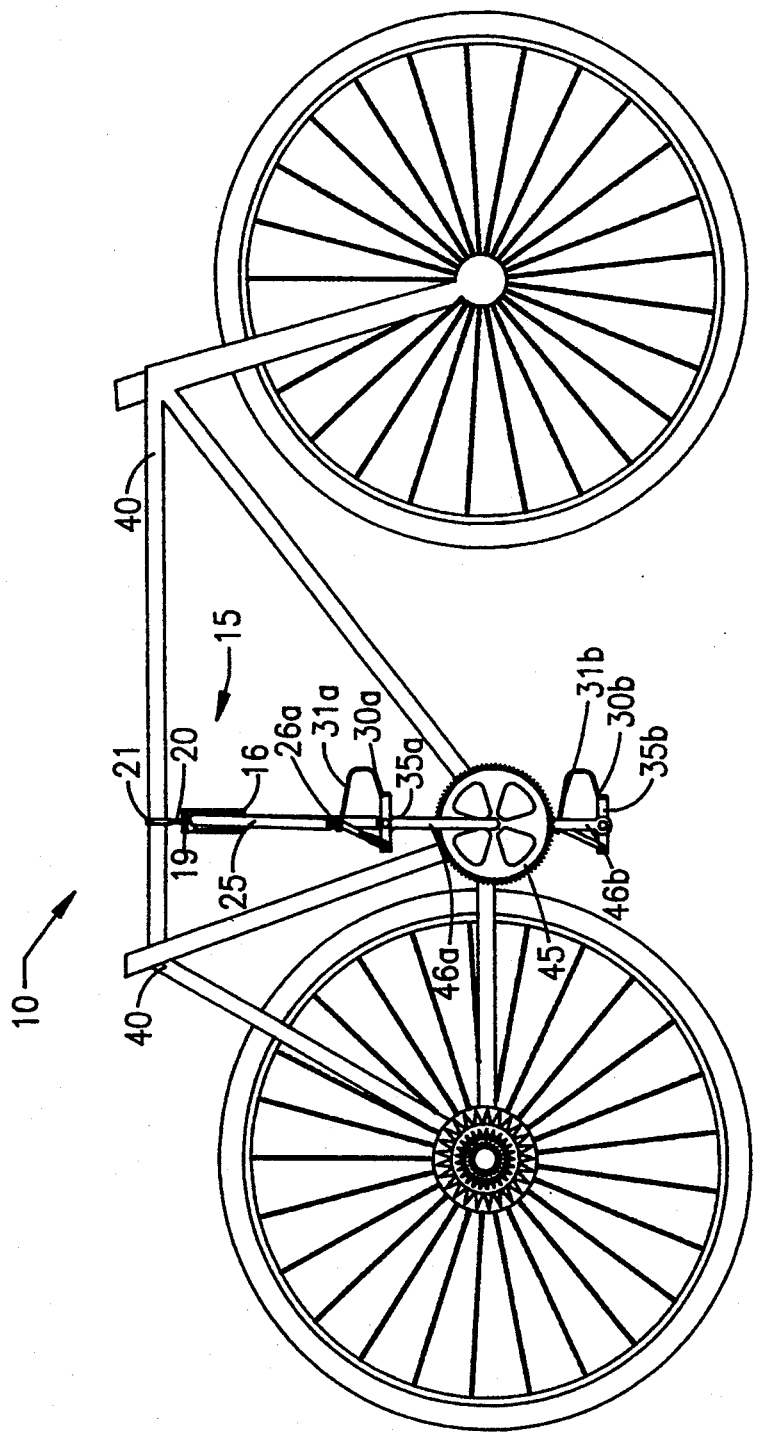
FIG. 3 is a side elevation view of the device for disposing toe clips on bicycle pedals in upright operative positions, depending from the crossbar of and connected to the bicycle pedals of a partially-viewed bicycle with the toe clips being generally horizontally positioned relative to one another.

FIGS. 2 and 3 show the device 10, for disposing the toe clips 30a & 30b on bicycle pedals 35a & 35b in upright operative positions, installed on a bicycle 40. The pivot member 20 is preferably a stainless steel ball bearing swivel 20a but could also be a flexible line 20b, which allows the pulley mechanism 15 to swivel or pivot as the bicycle pedals 35a & 35b and toe clips 31a & 31b are put in motion by the user of the bicycle 40. The rim of the wheel 18 of the pulley mechanism 15 pivots generally in the direction of the toe clips 30a & 30b and the pedals 35a & 35b during the motion thereof. As a result, the pulley mechanism 15 substantially prevents the elastic line 25 from becoming entangled with the bicycle 40 or with itself or even with the user and also functions as an anchor means to provide the tension to the elastic line 25 which urges the toe clips 30a & 30b in upright operative positions.

Figure 4:
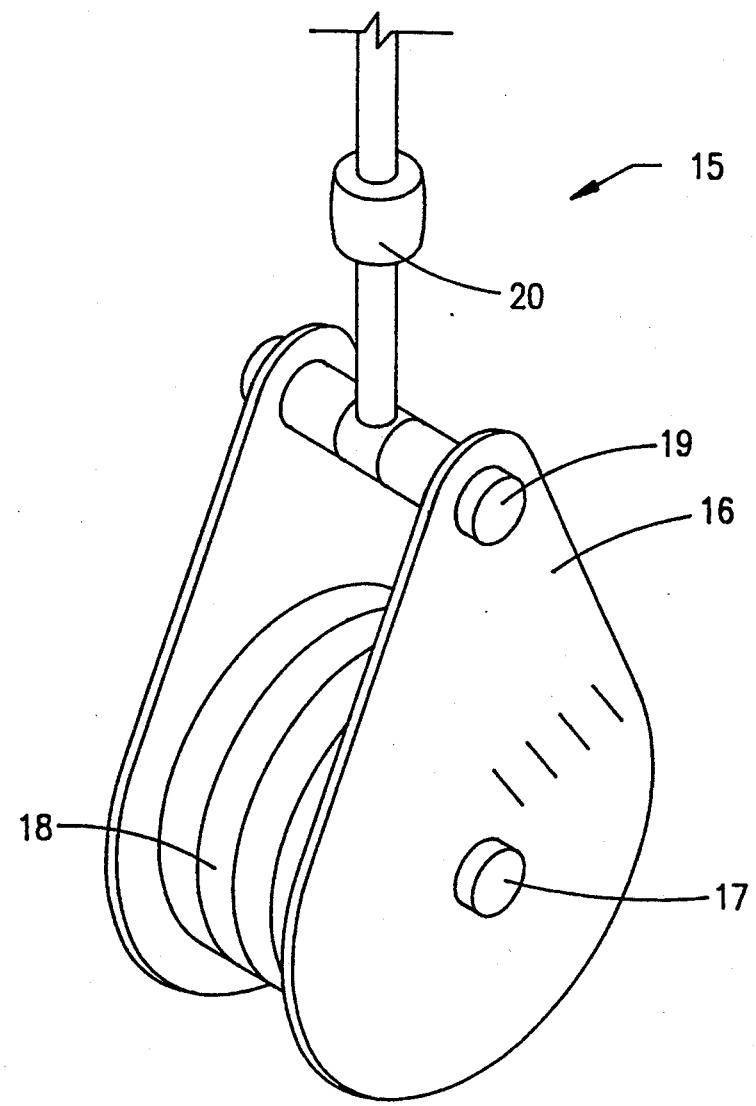
FIG. 4 is a detail view in perspective of the pulley mechanism depending from the pivot member.

FIG. 4 shows the pulley mechanism 15 comprising a block member or body 16 having two sides and a top, a shaft 17 fixedly mounted to the two side walls and within the body 16, a wheel 18 having a grooved circumferential end wall dimensioned for receiving the elastic line 25 and being rotatably mounted through the axis thereof about the shaft 17, and an eyelet 19 fixedly attached or disposed in the top of the block member or body 16 for removeably connecting to the pivot member 20. The pulley mechanism 15 is preferably made of plastic but could be made of lightweight metal.

As shown in FIGS. 2 and 3, the elastic line 25 has fastener means 26a & 26b at the ends thereof, which are removeably attached to the tops 31a & 31b of the toe clips 30a & 30b near the open ends where the user puts his/her footwear or feet into the toe clips 30a & 30b. The elastic line 25 is resilient and substantially remains taut whether the toe clips 30a & 30b are in motion or are stationary, and as a result, they won't hinder the user, because the elastic line 25 has substantially no slack anywhere therealong regardless if the pedals 35a & 35b and the toe clips 30a & 30b are in motion or are stationary anywhere in their respective orbital paths about the sprocket wheel 45, and will not become entangled with the user or with the bicycle 40 even when the toe clips 30a & 30b are closest to one another in their respective orbital paths. The elastic line 25 keeps the toe clips 30a & 30b in upright operative positions for the user to conveniently, quickly, and easily put his/her footwear or feet into the toe clips 30a & 30b without having to reach down with his/her hands or use his/her feet to turn the toe clips 30a & 30b upwardly into operative positions, a problem commonly encountered by all user's of bicycles and not solved by any of the prior art. This device 10 is very useful to any user who rises toe clips 30a & 30b on bicycle pedals 35a & 35b, because the toe clips 30a & 30b of where they positioned or fastened to the bicycle pedals 35a & 35b effect an imbalance on the pedals 35a & 35b causing the pedals 35a & 35b to turn forward and downward in the direction of the imbalances being the toe clips 30a & 30b. This device 10 substantially corrects these imbalances by urging the toe clips 30a & 30b in upright operative positions when they are not engaged by the user's footwear or feet. This device 10 is ideal for bicycling enthusiasts of all kinds including racing cyclists, mountain cyclists, and long distance cyclists.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A toe clips self-righting device on bicycle pedals comprising: toe clips disposed on said bicycle pedals; a pivot member suspended from a frame of a bicycle above said bicycle pedals; a pulley mechanism having a body, a shaft supported by said body, and a wheel rotatably mounted on said shaft, said pulley mechanism being suspended from said pivot member above said bicycle pedals; and an elastic line carried by said pulley mechanism and having fasteners at ends thereof, said fasteners detachably connected to tops of said toe clips, for steadying said toe clips in upright operative positions when not being engaged by a cyclist's shoes.

2. A toe clips self-righting device on bicycle pedals as described in claim 1, wherein said pivot member is a swivel which allows said pulley mechanism to pivot in response to movements of said toe clips.

3. A toe clips self-righting device on bicycle pedals as described in claim 1, wherein said pivot member is a flexible line connected to said pulley mechanism to allow said pulley mechanism to pivot in response to movements of said toe clips.

* * * * *